United States Patent
Chang et al.

(10) Patent No.: US 12,015,748 B2
(45) Date of Patent: Jun. 18, 2024

(54) DUAL-AXLE LINKAGE DETECTION STRUCTURE

(71) Applicant: KINPO ELECTRONICS, INC., New Taipei (TW)

(72) Inventors: Po-Chih Chang, New Taipei (TW); Sung-Po Lin, New Taipei (TW); Tzu-Cheng Chang, New Taipei (TW)

(73) Assignee: KINPO ELECTRONICS, INC., New Taipei (TW)

( * ) Notice: Subject to any disclaimer, the term of this patent is extended or adjusted under 35 U.S.C. 154(b) by 316 days.

(21) Appl. No.: 17/509,400

(22) Filed: Oct. 25, 2021

(65) Prior Publication Data

US 2023/0039368 A1 Feb. 9, 2023

(30) Foreign Application Priority Data

Aug. 5, 2021 (CN) .......................... 202121817923.8

(51) Int. Cl.
*H04N 1/04* (2006.01)
*H04N 1/00* (2006.01)

(52) U.S. Cl.
CPC ..... *H04N 1/00557* (2013.01); *H04N 1/00018* (2013.01); *H04N 1/00037* (2013.01); *H04N 1/00551* (2013.01); *H04N 2201/04713* (2013.01)

(58) Field of Classification Search
USPC .............. 358/1.15, 401, 498, 496, 497, 474
See application file for complete search history.

(56) References Cited

U.S. PATENT DOCUMENTS

| | | | | |
|---|---|---|---|---|
| 6,163,388 | A * | 12/2000 | Lee .................... | H04N 1/00795 358/488 |
| 6,646,768 | B1 * | 11/2003 | Andersen ........... | H04N 1/00588 358/488 |
| 9,372,468 | B2 * | 6/2016 | Kobayashi ......... | G03G 21/1623 |
| 2015/0029563 | A1 * | 1/2015 | Tao .................... | H04N 1/00554 358/474 |
| 2017/0142265 | A1 * | 5/2017 | Horikawa ............ | B65H 3/5261 |
| 2019/0208081 | A1 * | 7/2019 | Horiguchi .............. | H04N 1/407 |

* cited by examiner

*Primary Examiner* — Cheukfan Lee
(74) *Attorney, Agent, or Firm* — Chun-Ming Shih; HDLS IPR SERVICES

(57) ABSTRACT

A dual-axle linkage detection structure includes a first object, a second object, a sensor body, and a shielding element. The first object is movably connected to a base. The second object is movably connected to the first object. The sensor body is disposed on the first object and includes detecting positions. The shielding element includes a shielding part. When the second object covers the first object and the first object covers the base, the shielding part moves into the detecting position. When the second object moves away from the first object, or when the first object moves away from the base and drives the shielding element to rotate, the shielding part moves out of the detecting position.

20 Claims, 17 Drawing Sheets

DUAL-AXLE LINKAGE DETECTION STRUCTURE

BACKGROUND

Technical Field

The technical field relates to a detection structure, and particularly relates to a dual-axle linkage detection structure.

Description of Related Art

A flatbed scanner is one of the common business equipment in most offices or homes for scanning documents, photos and images and converting that into electronic data. Moreover, the flatbed scanner may be equipped with an automatic document feeder (ADF) to configure a multi-purpose scanning device, which utilities the automatic document feeder to scan a large number of documents to speed up the scanning operation. Additionally, the multi-purpose scanning device may scan through the flatbed scanner or the automatic document feeder. In this regard, the related-art multi-purpose scanning device may be configured to have sensors disposed on the flatbed scanner and the automatic document feeder respectively to detect the actions of the flatbed scanner and the automatic document feeder, so as to control actions of other related components.

However, the multi-purpose scanning device with multiple sensors may result in the high cost. Therefore, how to provide a detection structure that may reduce the quantity of sensors for reducing the total cost is the research motivation of this disclosure.

SUMMARY

This disclosure is directed to a dual-axle linkage detection structure.

One of the exemplary embodiments, this disclosure provides a dual-axle linkage detection structure disposed on a base. The structure includes a first object, a second object, a sensor body, and a shielding element. The first object is movably connected to the base. The second object is movably connected to the first object. The sensor body is disposed on the first object and includes a first detecting position and a second detecting position. The shielding element is disposed on the second object and includes a shielding part disposed corresponding to the sensor body. When the second object is configured to cover the first object and the first object is configured to cover the base simultaneously, the shielding part is located at the first detecting position. When the second object is configured to move away from the first object, or when the first object is configured to move away from the base, the shielding part is located at the second detecting position.

In one embodiment, this disclosure provides a dual-axle linkage detection structure disposed on a base. The structure includes a first object, a second object, a sensor body, and a shielding element. The first object is movably connected to the base and includes a first actuator member. The second object is movably connected to the first object and includes a second actuator member. The sensor body is disposed on the first object and includes a first detecting position and a second detecting position. The shielding element includes a swing arm and a shielding part connected to the swing arm. The swing arm is disposed pivotally on the first object by a shaft, and the shielding part is disposed corresponding to the first detecting position and the second detecting position. When the second object is configured to cover the first object and the first object is configured to cover the base, the shielding part is located at the first detecting position. When the second object is configured to move away from the first object and drive the swing arm to rotate around the shaft as an axle center through the second actuator member, or when the first object is configured to move away from the base and drive the swing arm to rotate around the shaft as the axle center through the first actuator member, the shielding part is located at the second detecting position.

According to the above, this disclosure has the following effects. The detection structure of this disclosure may achieve the function of detecting actions of the first object and the second object through disposing one single sensor for reducing the total cost.

BRIEF DESCRIPTION OF THE DRAWINGS

The features of the disclosure believed to be novel are set forth with particularity in the appended claims. The disclosure itself, however, may be best understood by reference to the following detailed description of the disclosure, which describes a number of exemplary embodiments of the disclosure, taken in conjunction with the accompanying drawings, in which:

DETAILED DESCRIPTION

Figure 1:
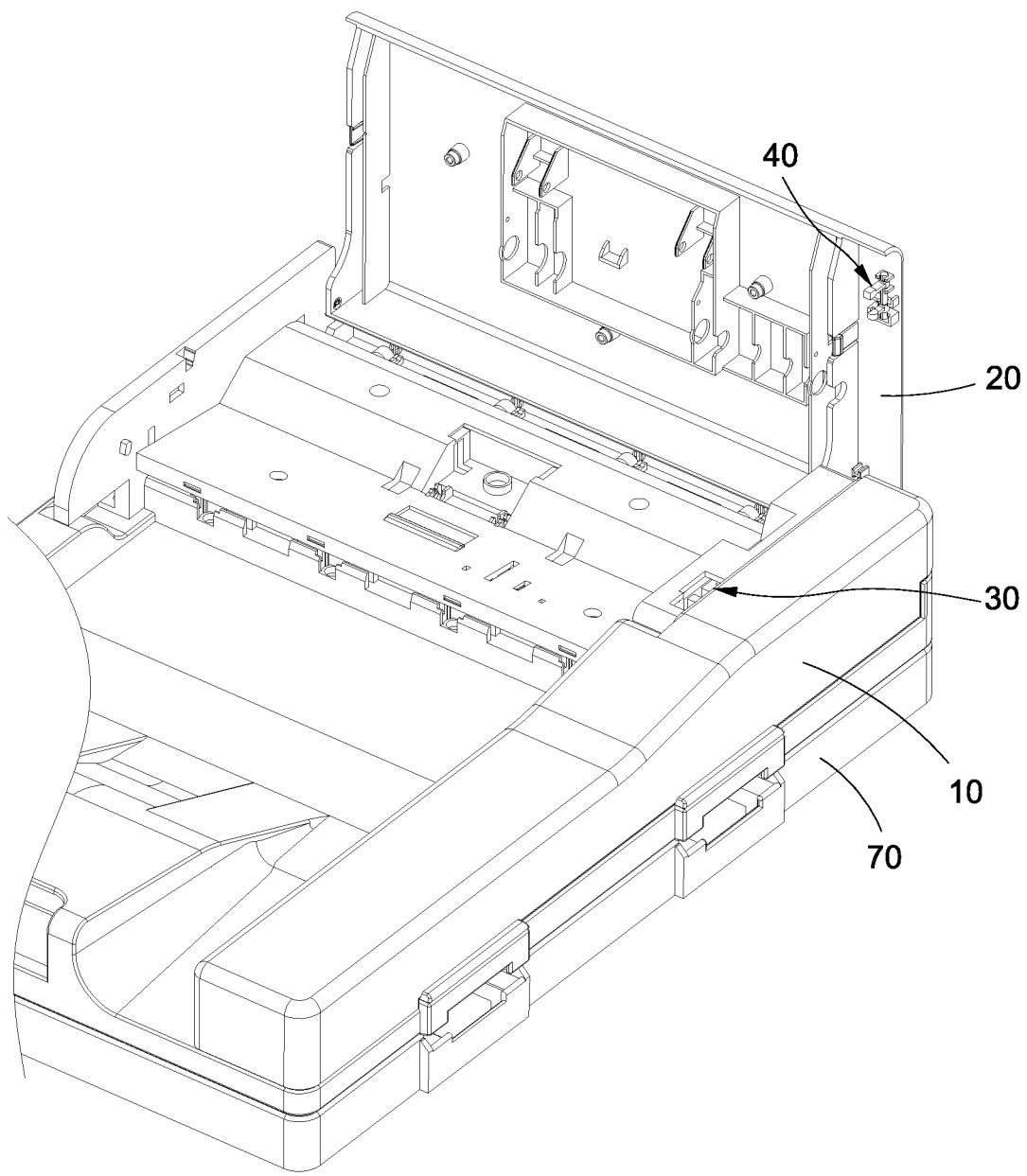
FIG. 1 is an operation schematic view of the dual-axle linkage detection structure of this disclosure applied in the multi-function scanner device.

The technical contents of this disclosure will become apparent with the detailed description of embodiments accompanied with the illustration of related drawings as follows. It is intended that the embodiments and drawings disclosed herein are to be considered illustrative rather than restrictive.

Please refer to FIG. 1 to FIG. 4, which depict an operation schematic view of the dual-axle linkage detection structure of this disclosure applied in the multi-function scanner device, a combination schematic view of the dual-axle linkage detection structure in this disclosure, and cross-sectional views of two sides of the dual-axle linkage detection structure in this disclosure. The dual-axle linkage detection structure 1 of this disclosure includes a first object 10, a second object 20, a sensor body 30, and a shielding element 40. The second object 20 is combined on the first object 10 and may move relative to the first object 10. Moreover, the sensor body 30 is disposed on the first object 10. The shielding element 40 is disposed on the second object 20. Accordingly, when the first object 10 or the second object 20 is actuated, the shielding element 40 is driven to trigger the sensor body 30. Therefore, the actions of the first object 10 and the second object 20 may be detected. The detail of the dual-axle linkage detection structure 1 is as follows.

Figure 2:
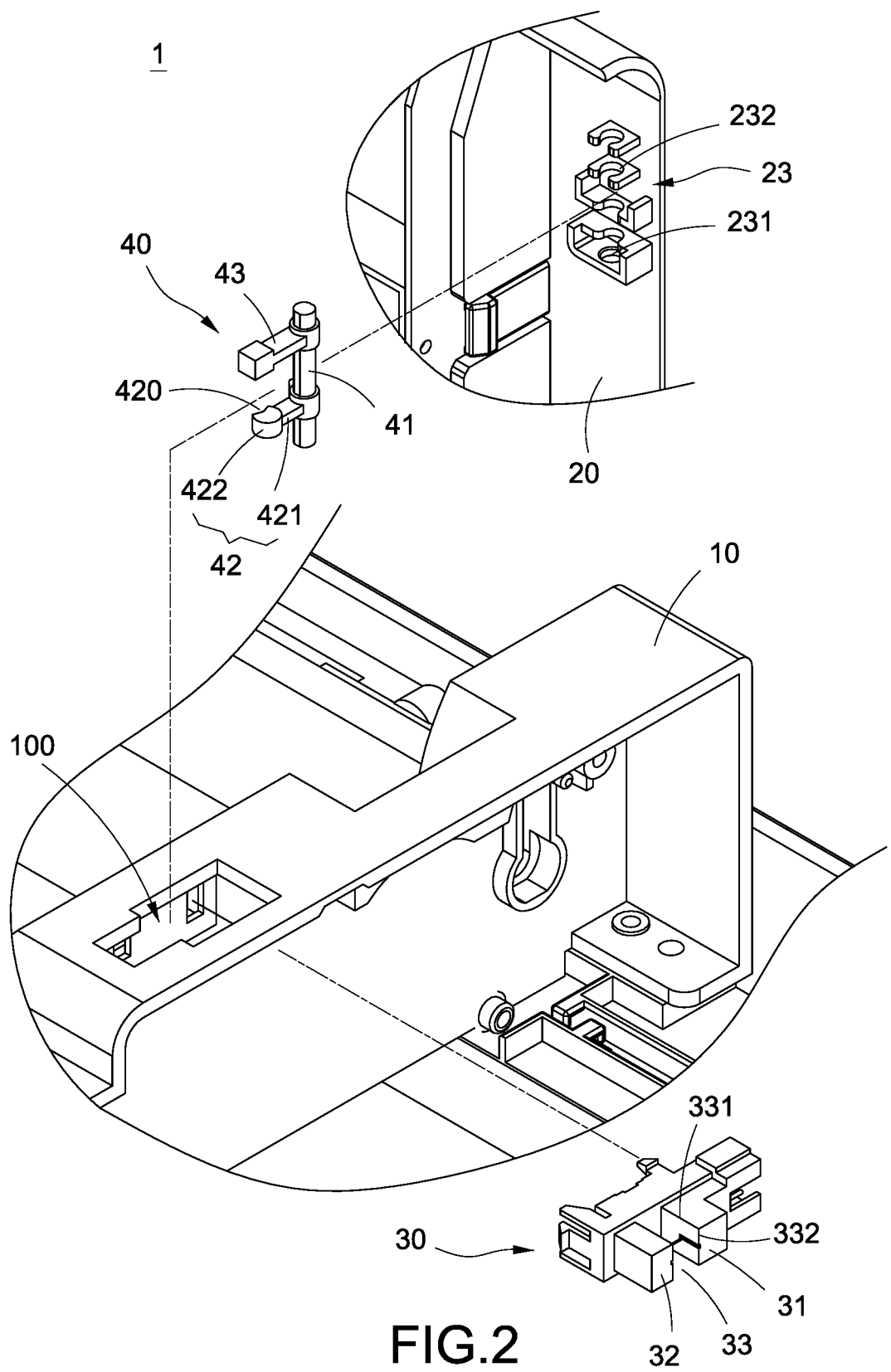
FIG. 2 is a combination schematic view of the dual-axle linkage detection structure in this disclosure.

Please refer to FIG. 1 and FIG. 2. In this embodiment, the dual-axle linkage detection structure 1 is disposed on a base 70. The first object 10 includes an accommodating space 100, and the first object 10 is movably connected to the base 70. Additionally, the second object 20 is movably connected to the first object 10. The second object 20 covers the first object 10 and may move away from the first object 10.

In one embodiment of this disclosure, the base 70 includes a scanner body, and the first object 10 includes a scanner cover. Additionally, the scanner cover is combined on the scanner body. In this embodiment, the scanner cover may be lifted relative to the scanner body.

Moreover, the second object 20 includes a paper feeder cover. The second object 20 covers the first object 10 and may move away from the first object 10.

The sensor body 30 is disposed in the accommodating space 100. In this embodiment, the sensor body 30 is a non-contact sensor, such as an optical sensor. The sensor body 30 includes a transmitting terminal 31 and a receiving terminal 32 opposite to each other, and includes a detecting slot 33 located between the transmitting terminal 31 and the receiving terminal 32. Specifically, the sensor body 30 sends a detecting signal from the transmitting terminal 31 to the receiving terminal 32 through the detecting slot 33 to form a detecting position. In more detail, the detecting slot 33 includes an upper opening 331 facing the shielding element 40 and a side opening 332 perpendicular to the upper opening 331.

Moreover, the shielding element 40 includes a shielding part 42 disposed corresponding to the detecting position. In this embodiment, the shielding element 40 further includes a rotating shaft 41 connected to the shielding part 42. The shielding part 42 includes a rod 421 connected to the rotating shaft 41 and a blocking part 422 located on the end of the rod 421. In this embodiment, the blocking part 422 is a cylinder and includes a notch 420. Additionally, the shielding element 40 further includes a first counterweight 43 connected to the rotating shaft 41 and disposed on one side of the shielding part 42 spacedly.

It should be noted that the notch 420 disposed on the blocking portion 422 of the shielding part 42 may increase the sensing sensitivity, here is not intended to be limiting. In addition, the arrangement of the first counterweight 43 may facilitate the rotation of the rotating shaft 41 to drive the shielding part 42 to move out of the detecting slot 33.

In this embodiment, the second object 20 includes a plurality of positioning portions 23, and the rotating shaft 41 is disposed on each of the positioning portions 23. Specifically, each positioning portion 23 includes an axle hole 231 and a plurality of grooves 232. The shielding element 40 is combined on the second object 20 by inserting the rotating shaft 41 to the axle hole 231 and engaging the rotating shaft 41 with the grooves 232.

Figure 3:
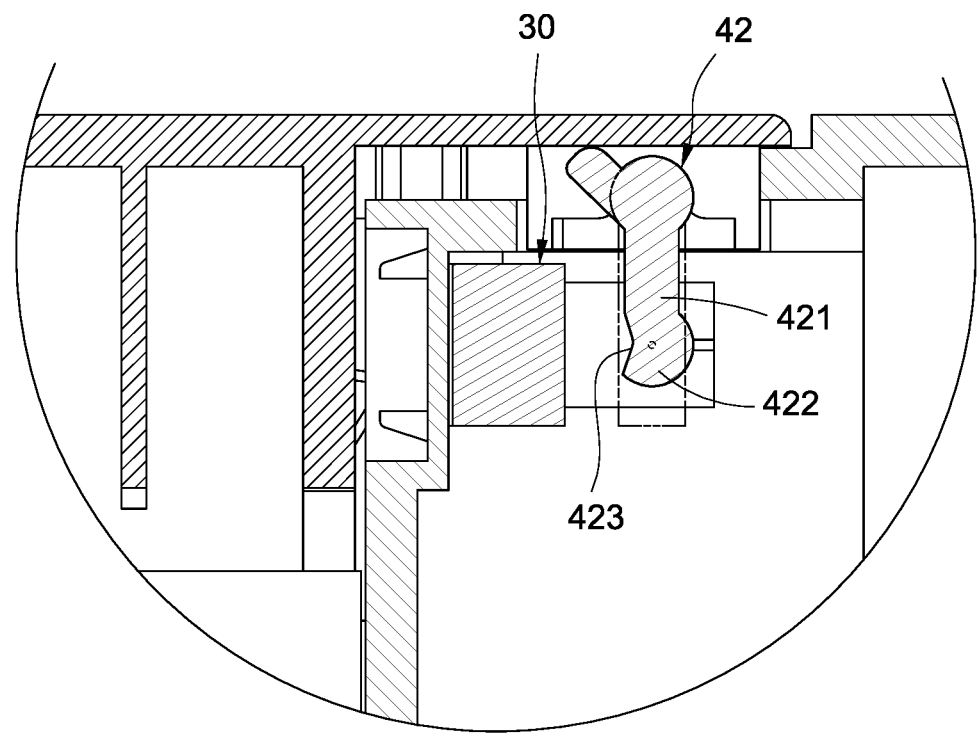
FIG. 3 and FIG. 4 are cross sectional views of two sides of the dual-axle linkage detection structure in this disclosure.
Figure 4:
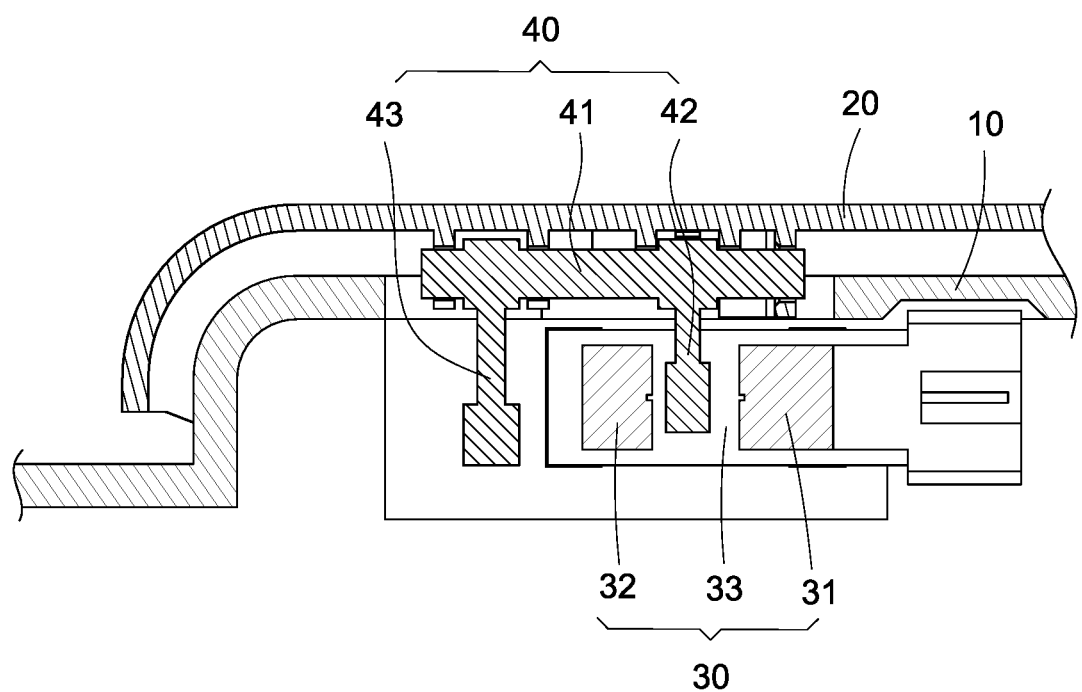

Please further refer to FIG. 3 and FIG. 4. In this embodiment, the sensor body 30 is disposed on the first object 10 (scanner cover). In addition, the rotating shaft 41 of the shielding element 40 is rotatably coupled to the second object 20 (paper feeder cover). Accordingly, when the second object 20 (paper feeder cover) covers the first object 10 (scanner cover), and the first object 10 (scanner cover) covers the base 70 (scanner body), the shielding part 42 moves into the detecting slot 33 to block the detecting signal sent from the transmitting end 31 of the sensor body 30. The shielding part 42 is located at the first detecting position.

Figure 5:
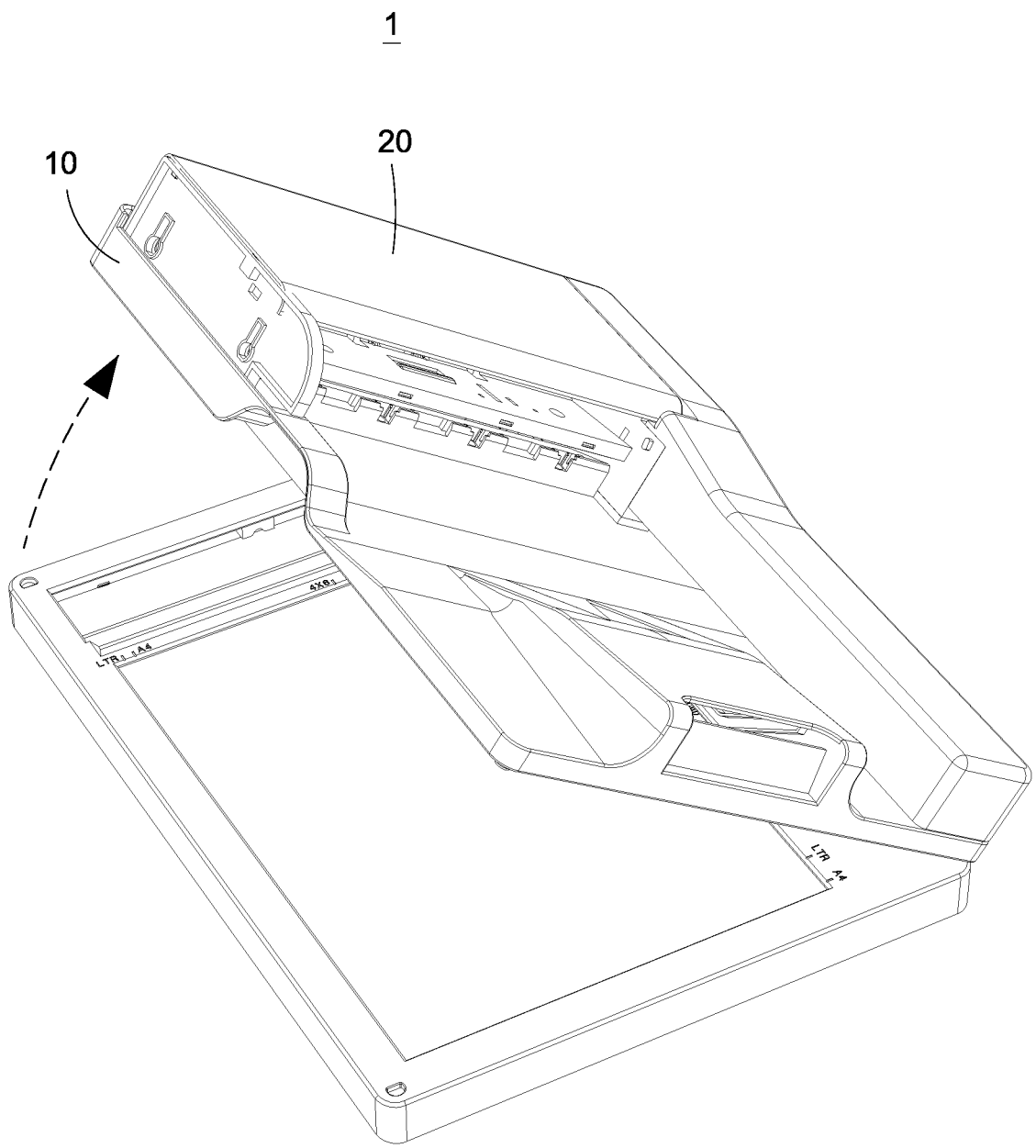
FIG. 5 is a schematic view of the first object moving away from the base in this disclosure.
Figure 6:
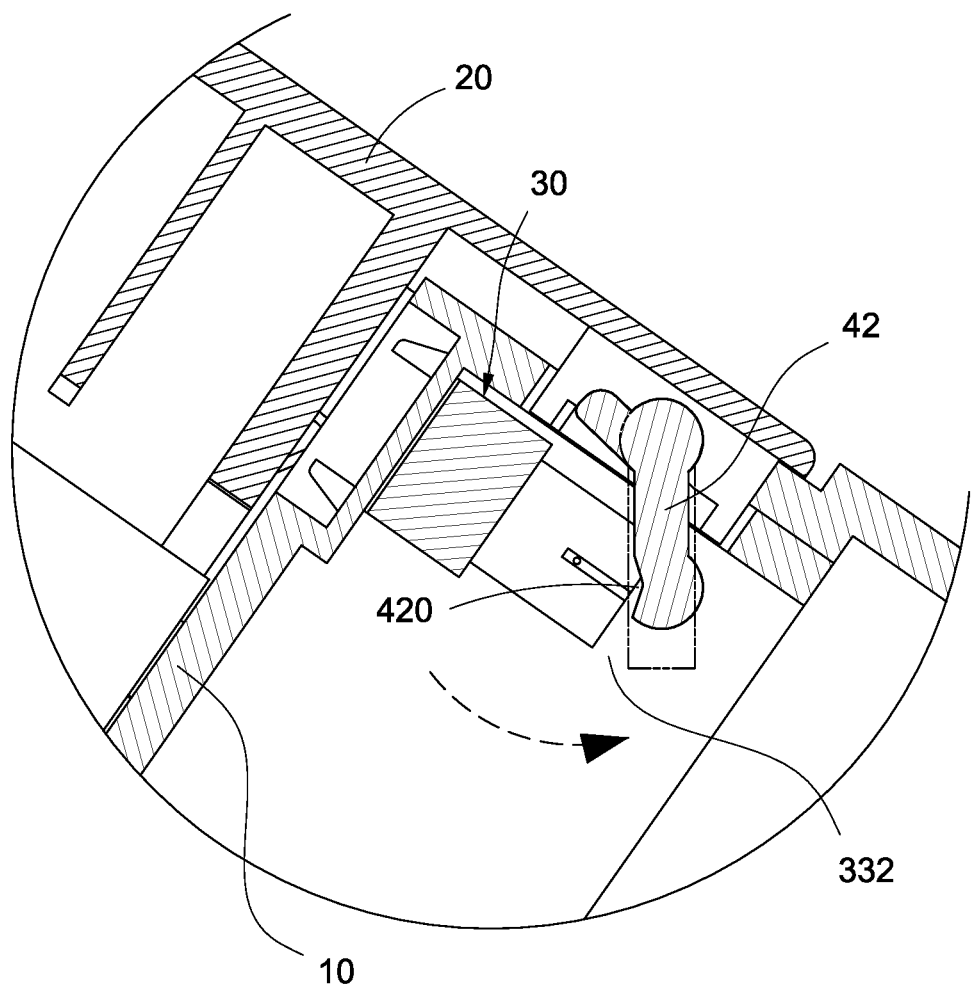
FIG. 6 is an operation schematic view of the detection structure of this disclosure when the first object is actuated.

Please refer to FIG. 5 and FIG. 6, which depict a schematic view of the first object moving away from the base in this disclosure and an operation schematic view of the detection structure of this disclosure when the first object is actuated. Referring to FIG. 5, in this embodiment, the sensor body 30 includes a first detecting position and a second detecting position for detection. The first detecting position may be defined as the shielding part 42 moving into the detecting slot 33, and the second detecting position may be defined as the shielding part 42 moving out of the detecting slot 33. Similarly, the first detecting position may also be defined as the shielding part 42 moving out of the detecting slot 33, and the second detecting position may be defined as the shielding part 42 moving into the detecting slot 33. When the first object 10 moves away from the base 70 (the scanner cover is lifted relative to the scanner body), the first object 10 may drive the shielding element 40 to rotate around the shaft 41 as the axle center. Then, the shielding part 42 moves out of the detecting slot 33 (first detecting position) to trigger the sensor body 30. The shielding part 42 is located at the second detecting position.

Specifically, the shielding part 42 is driven to move out of the detecting slot 33 from the side opening 332 of the sensor body 30. Accordingly, the detecting signal sent from the transmitting terminal 31 may not be blocked by the shielding part 42 and may be transmitted to the receiving terminal 32 to trigger the sensor body 30, so as to achieve the function of detecting the action of the first object 10.

It should be noted that the notch 420 of the shielding part 42 may enable the sensor body 30 to be triggered with respect to a smaller swing angle of the shielding part 42, so as to increase the sensitivity during detection.

Figure 7:
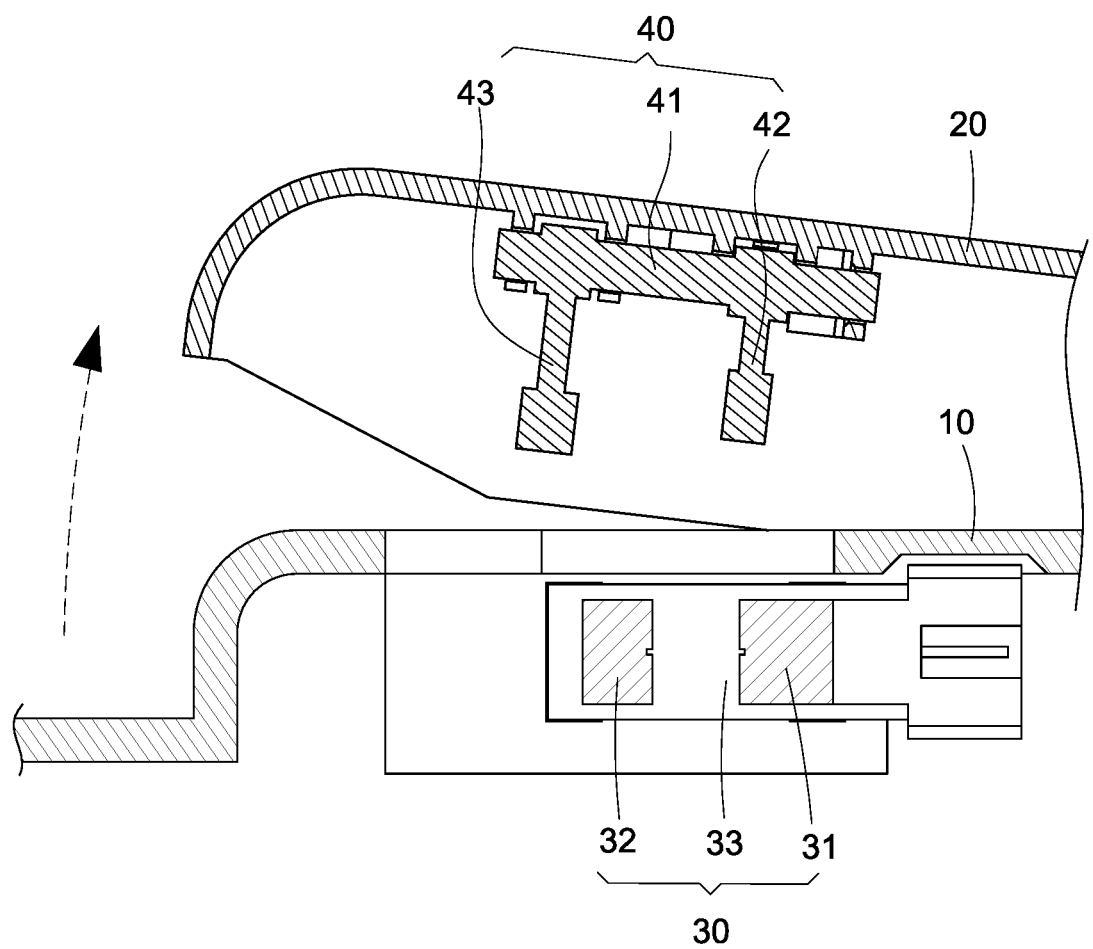
FIG. 7 is a schematic view of the second object moving away from the first object in this disclosure.

Please further refer to FIG. 7, which depicts a schematic view of the second object moving away from the first object in this disclosure. When the second object 20 moves away from the first object 10 (referring to FIG. 1, the paper feeder cover is lifted relative to the scanner cover), the shielding part 42 is driven by the second object 20 to move out of the detecting slot 33 (first detecting position) to trigger the sensor body 30.

Specifically, the shielding part 42 is driven to move out of the detecting slot 33 from the upper opening 331. Accordingly, the detecting signal sent from the transmitting terminal 31 may not be blocked by the shielding part 42 and may be transmitted to the receiving terminal 32 to trigger the sensor body 30, so as to achieve the function of detecting the action of the second object 20.

Figure 8:
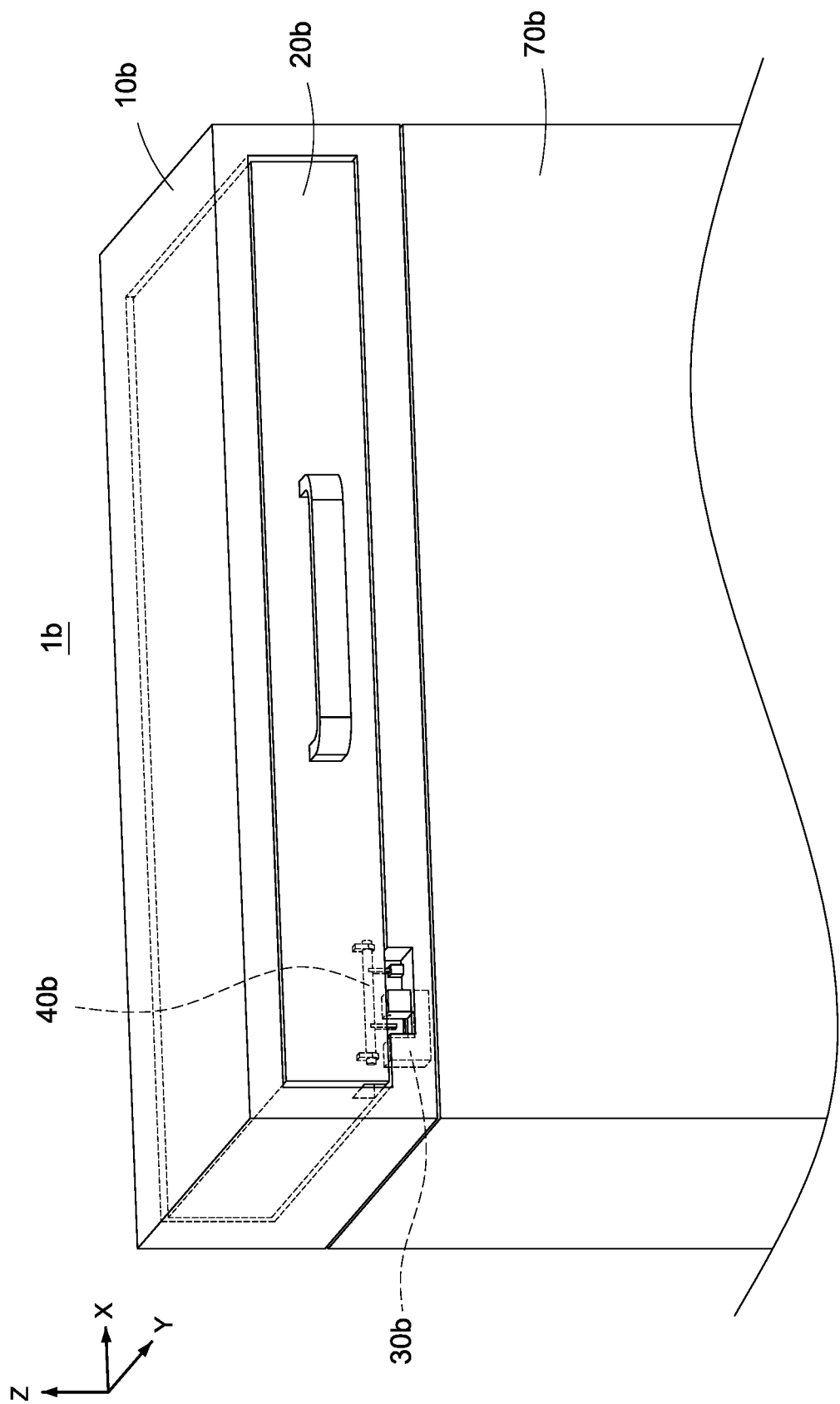
FIG. 8 is the second embodiment of the dual-axle linkage detection structure in this disclosure.
Figure 9:
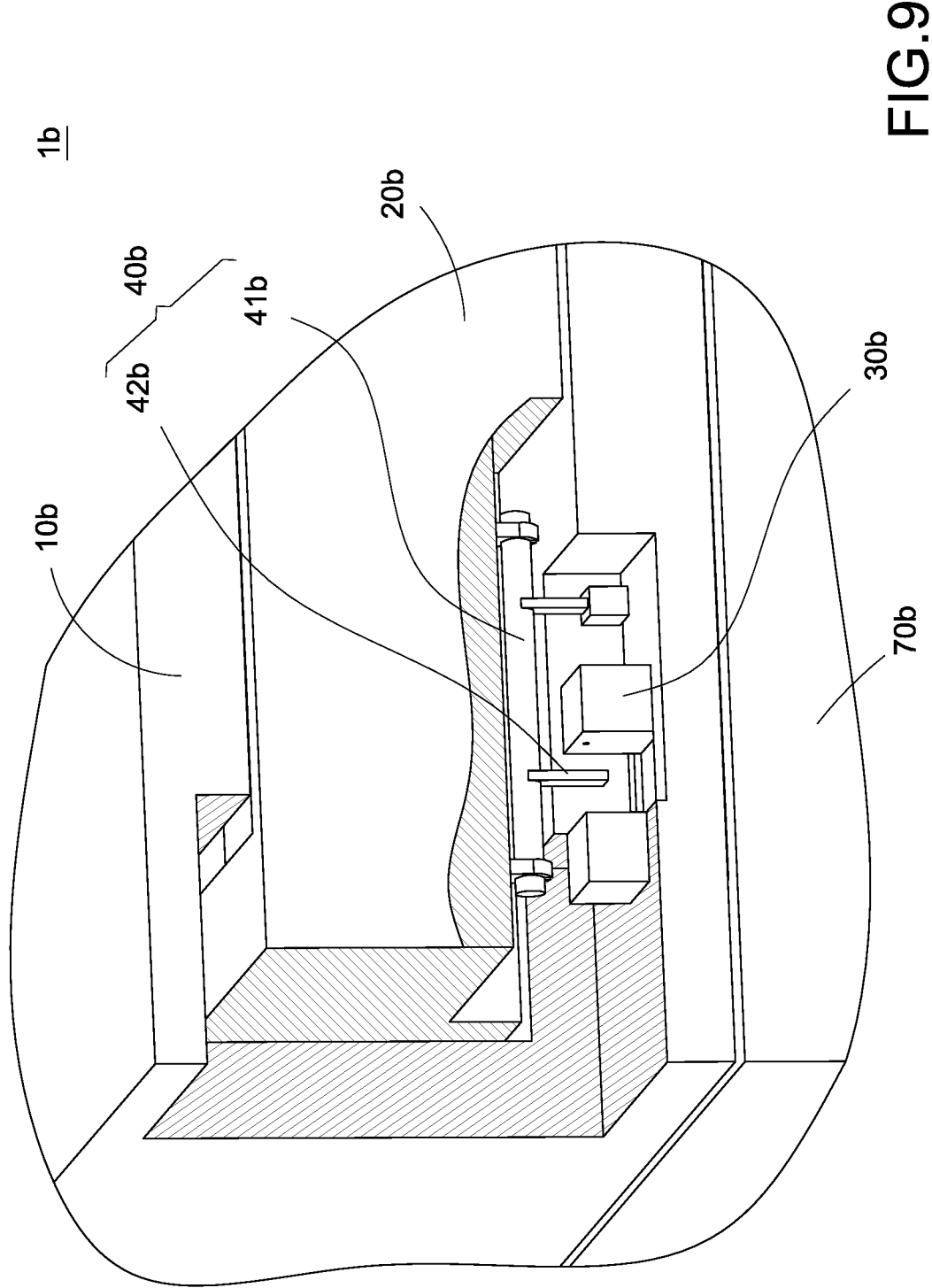
FIG. 9 is an arrangement schematic view of the second embodiment of the dual-axle linkage detection structure in this disclosure.

Please refer to FIG. 8 and FIG. 9, which respectively depict the second embodiment of the dual-axle linkage detection structure in this disclosure. In this embodiment, the dual-axle linkage detection structure 1b is disposed on a base 70b. The dual-axle linkage detection structure 1b includes a first object 10b, a second object 20b, a sensor body 30b, and a shielding element 40b. The second object 20b is movably connected to the first object 10b. Moreover, the sensor body 30b is disposed on the first object 10b, and the shielding element 40b is also disposed on the second object 20b. Additionally, the shielding element 40b includes a rotating shaft 41b and a shielding part 42b connected to the rotating shaft 41b.

Figure 10:
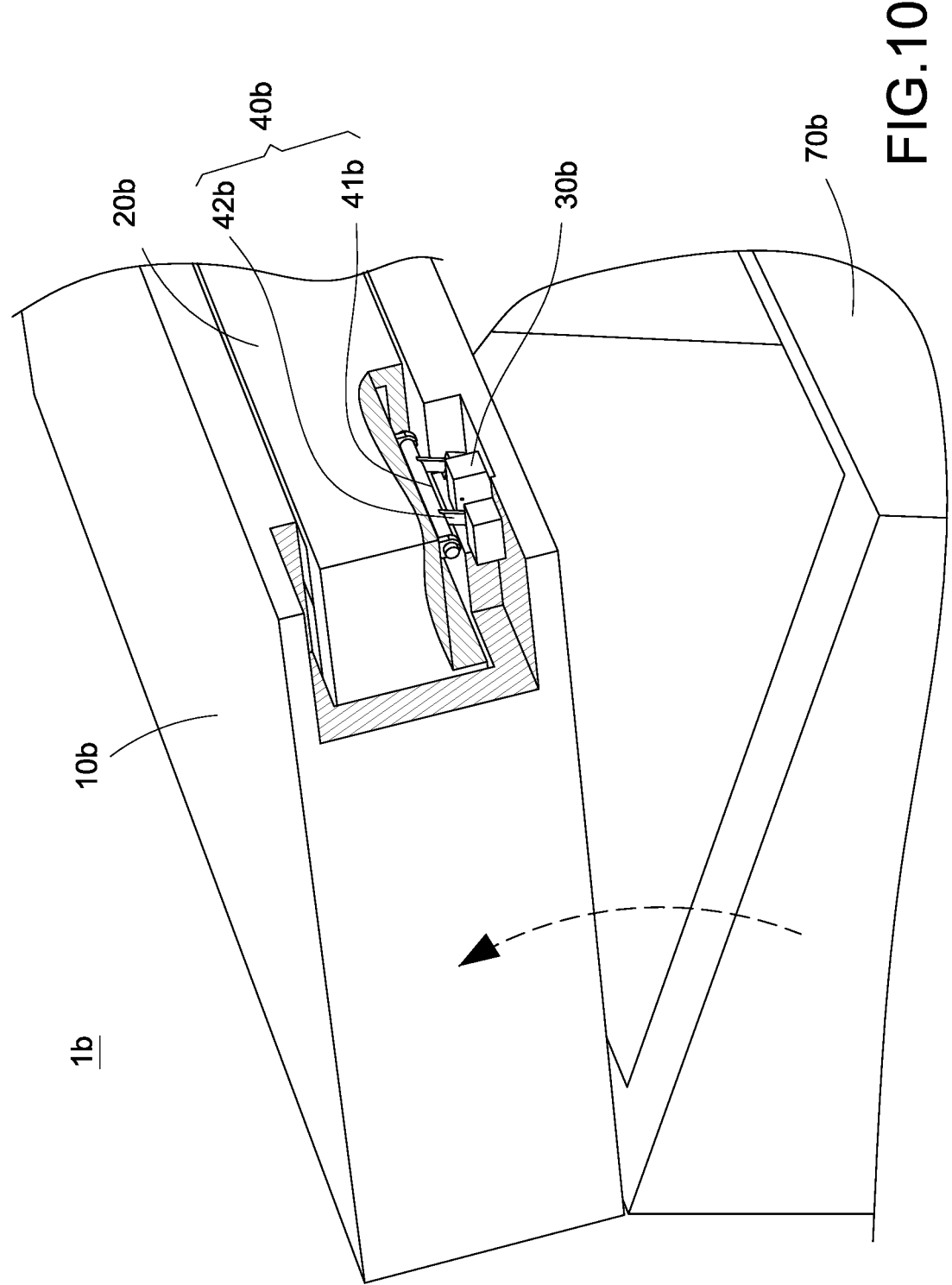
FIG. 10 is an operation schematic view of the second embodiment of the dual-axle linkage detection structure when the first object is actuated.
Figure 11:
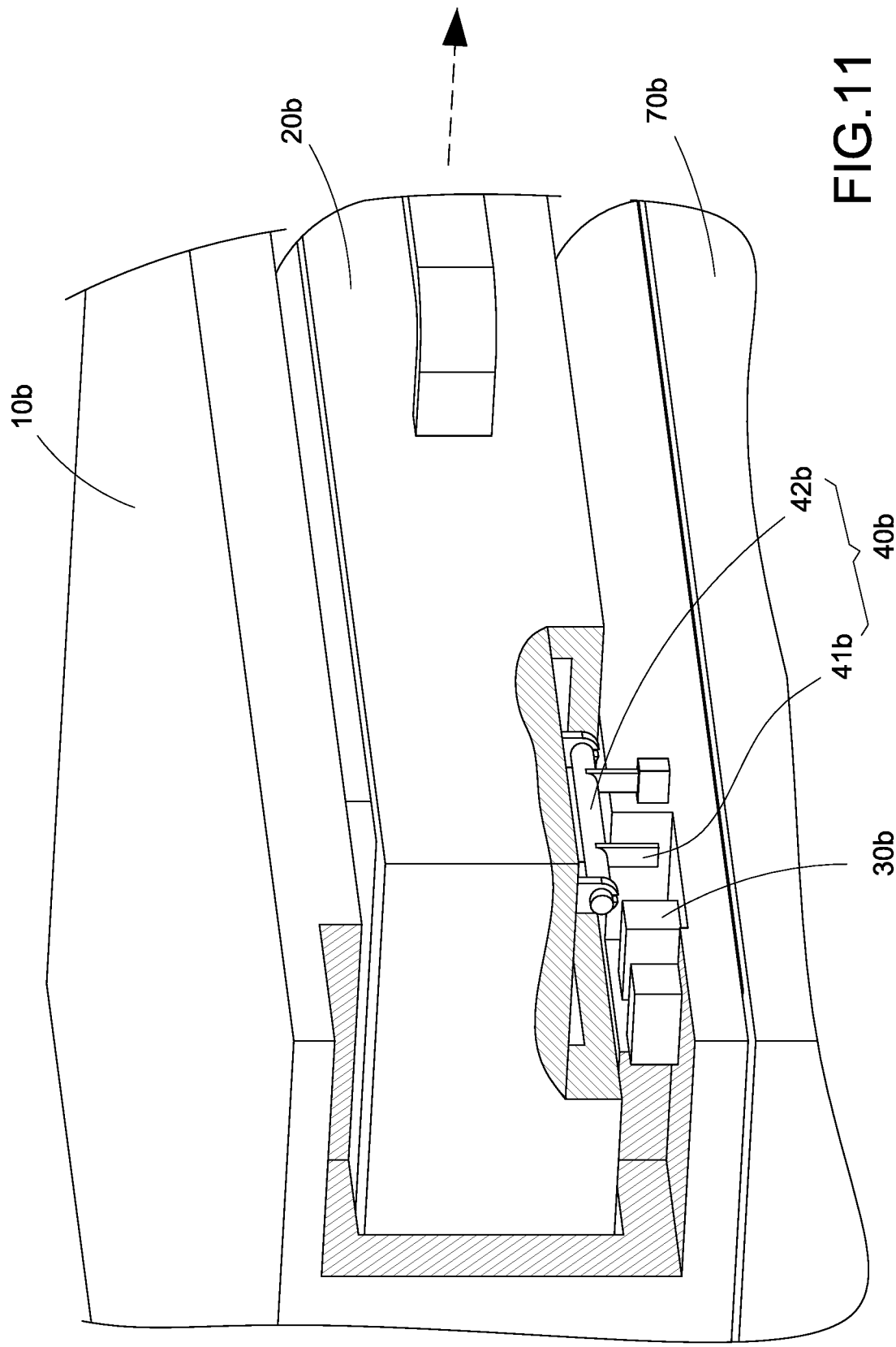
FIG. 11 is an operation schematic view of the second embodiment of the dual-axle linkage detection structure when the second object is actuated.

Please further refer to FIG. 10 and FIG. 11, which depict operation schematic views of the second embodiment of the dual-axle linkage detection in this disclosure. In this embodiment, the first object 10b includes a cover, and the cover is movably connected to the base 70b. Additionally, when the first object 10b moves away from the base 70b (the cover is lifted relative to the base 70b), the first object 10b drives the shielding part 42b to move out of the sensor body 30b to trigger the sensor body 30b.

When the first object 10b moves away from the base 70b, or when the second object 20b moves away from the first object 10b and the first object 10b moves away from the base 70b, the shielding part 42b moves out from the sensor body 30b to trigger sensor body 30b, so as to achieve the function of detecting the actions of the first object 10b and the second object 20b.

Figure 12:
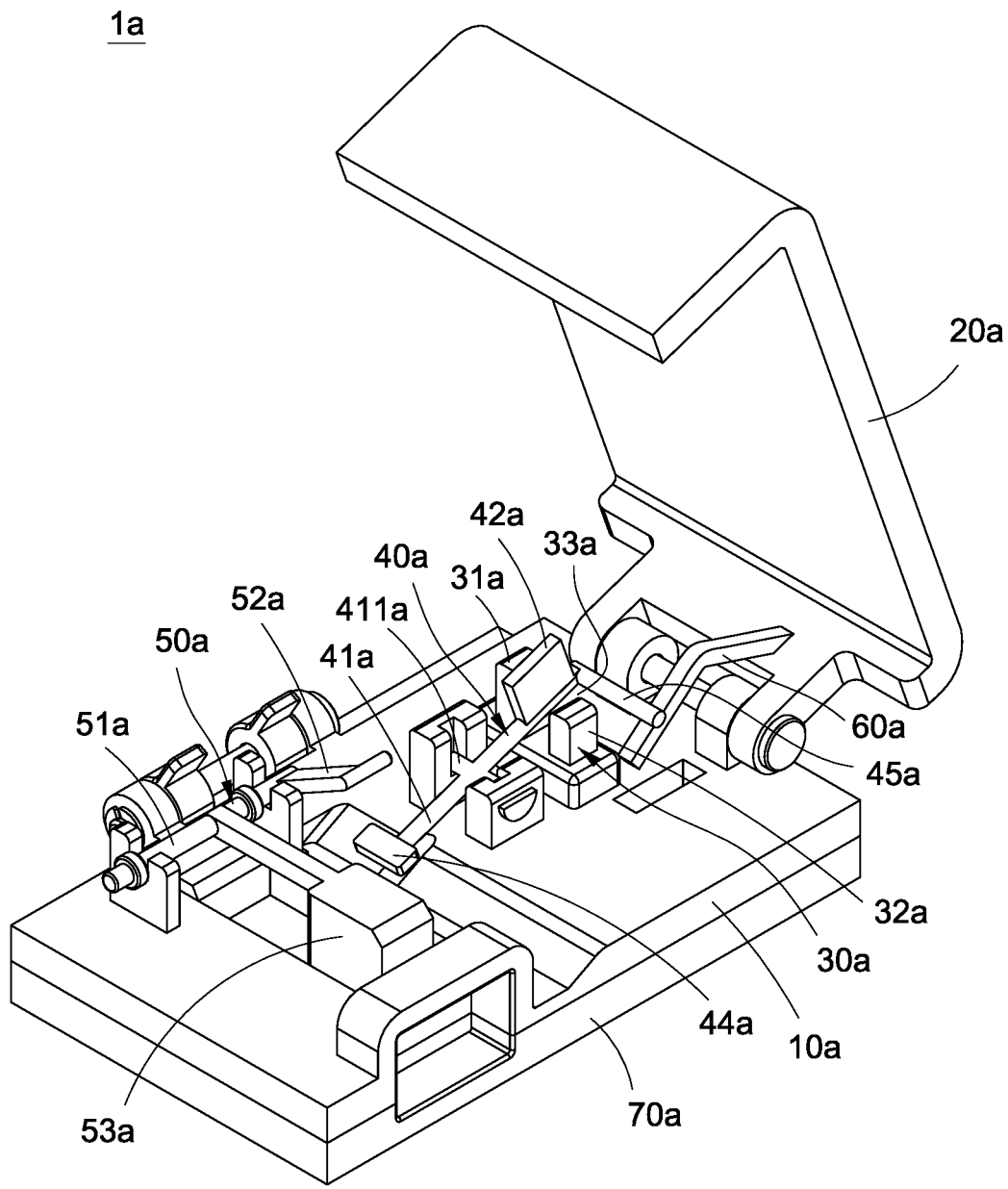
FIG. 12 is the third embodiment of the dual-axle linkage detection structure in this disclosure.

Please further refer to FIG. 12, which depicts the third embodiment of the dual-axle linkage detection structure in this disclosure. This embodiment is similar to the previous embodiment. The dual-axle linkage detection structure 1a is disposed on a base 70a and includes a first object 10a, a second object 20a, a sensor body 30a, and a shielding element 40a. The sensor body 30a and the shielding element 40a are both disposed on the first object 10a. The action of the first object 10a or the second object 20a may drive the shielding element 40a to move relative to the sensor body 30a to trigger the sensor body 30a, so as to achieve the function of detecting the actions of the first object 10a and the second object 20a.

In this embodiment, the first object 10a is movably connected to the base 70a, and the first object 10a includes a first actuator member 50a. Moreover, the second object 20a is movably connected to the first object 10a and connected with a second actuator member 60a. In this embodiment, the second actuator member 60a includes a protruding rib disposed on an inner wall of the second object 20a.

Moreover, the sensor body 30a is disposed on the first object 10a. The sensor body 30a includes a transmitting terminal 31a, a receiving terminal 32a and a detecting slot 33a located between the transmitting terminal 31a and the receiving terminal 32a. The sensor body 30a sends a detecting signal from the transmitting terminal 31a to the receiving terminal 32a through the detecting slot 33a to form a detecting position. Specifically, the shielding element 40a includes a swing arm 41a and a shielding part 42a connected to the swing arm 41a. The swing arm 41a is disposed pivotally on the first object 10a by a shaft 411a, and the shielding part 42a is disposed corresponding to the detecting position. Additionally, the shielding element 40a further includes a compressing part 44a and a lifting part 45a. The compressing part 44a is connected to the swing arm 41a and located on the side opposite to the shielding part 42a. The lifting part 45a is connected to the swing arm 41a and located on one side of the shielding part 42a.

It should be noted that when the second object 20a covers the first object 10a and the first object 10a covers the base 70a, the shielding part 42a moves into the detecting slot 33a (first detecting position).

Moreover, the first actuator member 50a includes a pivot 51a, a pressing plate 52a connected to the pivot 51a, and a second counterweight 53a disposed on one side of the pressing plate 52a spacedly. The pressing plate 52a is disposed corresponding to the position of the compressing part 44a. It should be noted that the arrangement of the second counterweight 53a may facilitate the pressing of the pressing plate 52a to the compressing part 44a to drive the shielding part 42a to move out of the detecting slot 33a (first detecting position).

Figure 13:
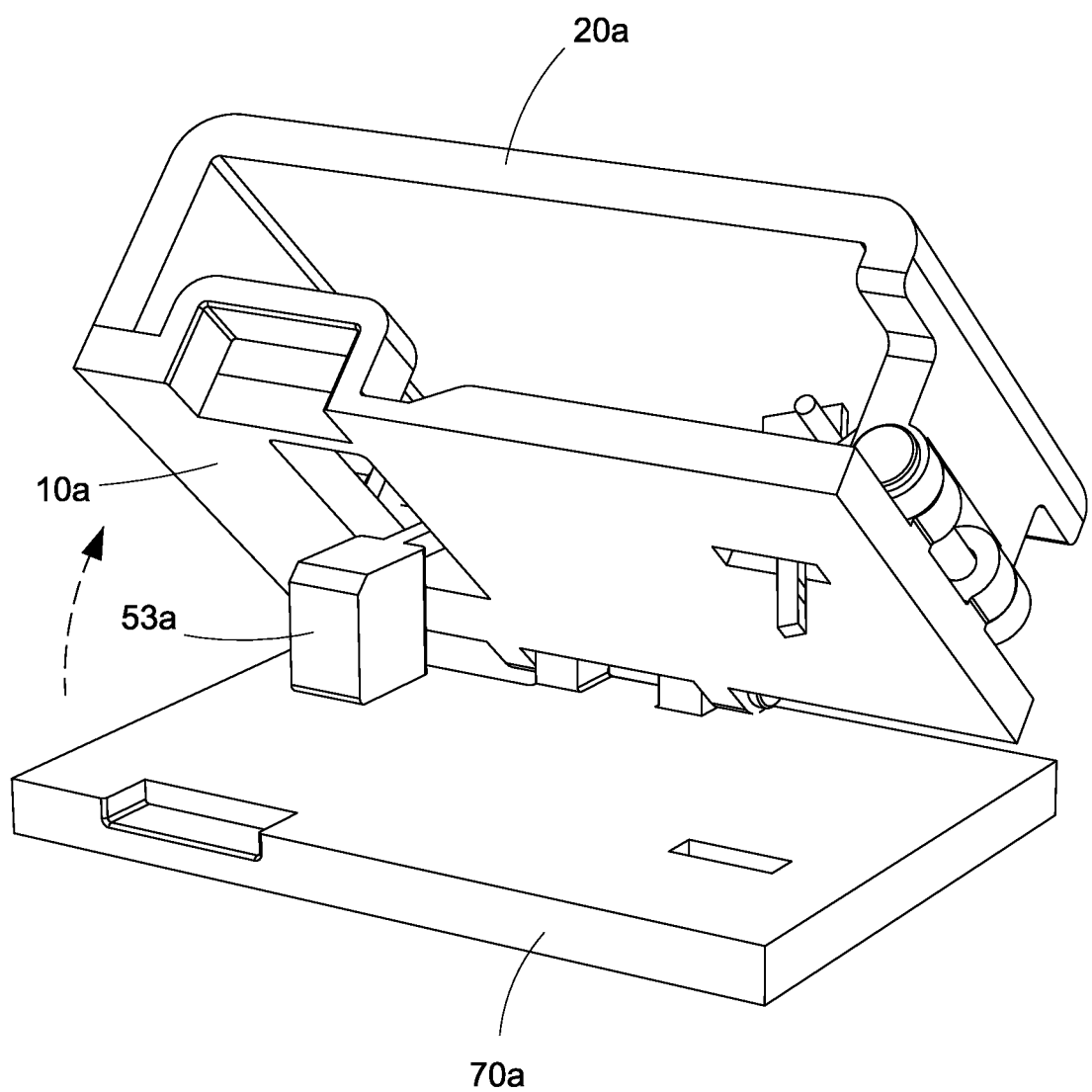
FIG. 13 and FIG. 14 are operation schematic views of the third embodiment of the dual-axle linkage detection structure when the first object is actuated.
Figure 14:
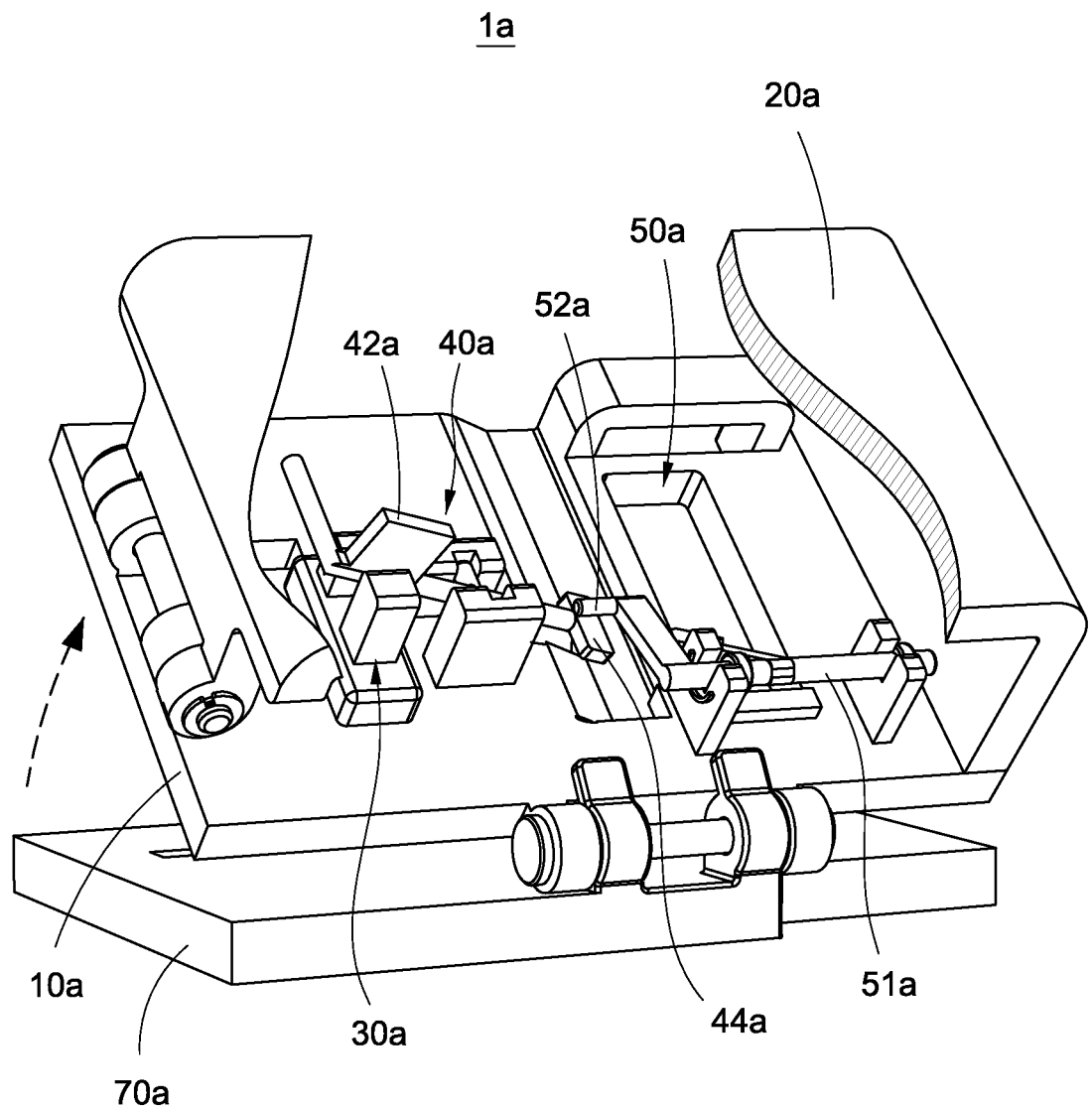

Please refer to FIG. 13 and FIG. 14, which depict operation schematic views of the third embodiment of the dual-axle linkage detection structure when the first object is actuated. When the first object 10a moves away from the base 70a and drives the swing arm 41a to rotate around the shaft 411a as the axle center through the first actuator member 50a, the shielding part 42a moves out of the detecting slot 33a (first detecting position).

In more detail, when the first object 10a moves away from the base 70a, the second counterweight 53a moves toward the lower base 70a and drives the pivot 51a to rotate. Then, the pressing plate 52a may press the compressing part 44a downwardly along with the rotation of the pivot 51a. When the compressing part 44a is moved downwardly, the swing arm 41a rotates around the shaft 411a as the axle center and drives the shielding part 42a to move out of the detecting slot 33a upwardly (first detecting position) to trigger the sensor body 30a, so as to achieve the function of detecting the action of the first object 10a.

Figure 15:
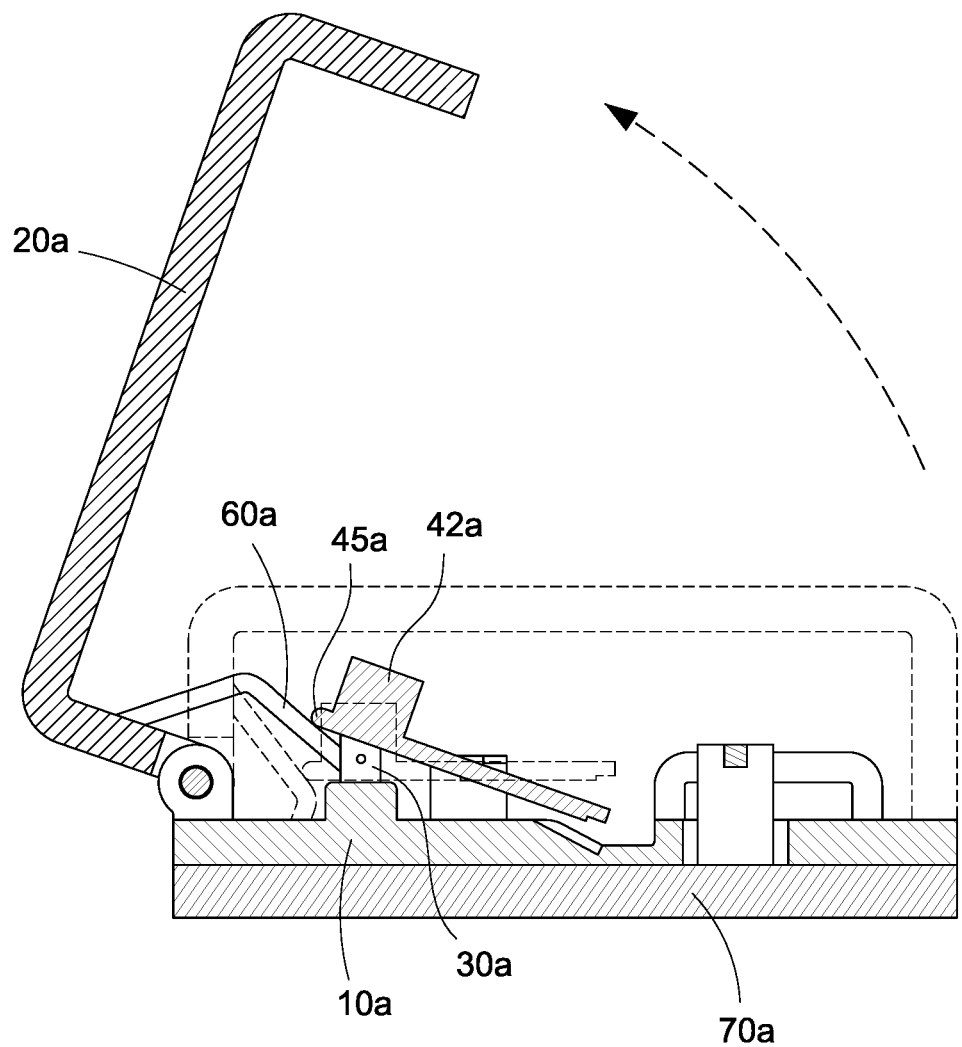
FIG. 15 is an operation schematic view of the third embodiment of the dual-axle linkage detection structure when the second object is actuated.

Please further refer to FIG. 15, which depicts an operation schematic view of the third embodiment of the dual-axle linkage detection structure when the second object is actuated. As shown in the figure, when the second object 20a moves away from the first object 10a and drives the swing arm 41a to rotate around the shaft 411a as the axle center through the second actuator member 60a (refer to FIG. 12), the shielding member 42a moves out of the detecting slot 33a (first detecting position).

In more detail, when the second object 20a moves away from the first object 10a, the second actuator member 60a may drive the lifting part 45a to move upwardly. Then, the swing arm 41a is driven to rotate around the shaft 411a as the axle center and drive the shielding member 42a to move out of the detecting slot 33a (first detecting position) to trigger the sensor body 30a, so as to achieve the function of detecting the action of the first object 10a.

Accordingly, the first object 10a and the second object 20a are actuated to drive the shielding element 40a to move out of detecting slot 33a (first detecting position) to trigger the sensing body 30a, so as to achieve the function of detecting the actions of the first object 10a and the second object 20a.

Figure 16:
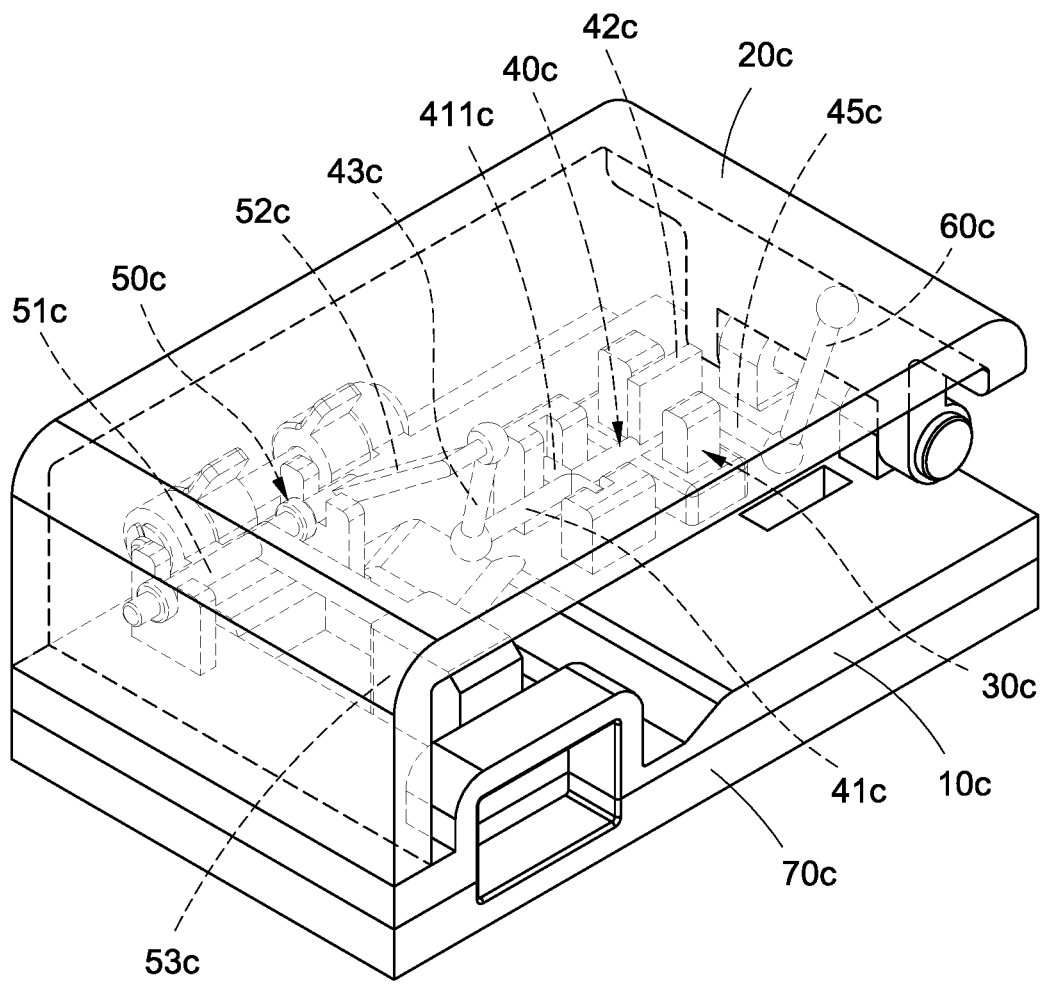
FIG. 16 is the fourth embodiment of the dual-axle linkage detection structure in this disclosure.

Please further refer to FIG. 16, which depicts the fourth embodiment of the dual-axle linkage detection structure in this disclosure. This embodiment is similar to the previous embodiment, and the difference is on the arrangements of the shielding element and the second actuator member. In this embodiment, the dual-axle linkage detection structure 1c is disposed on a base 70c and includes a first object 10c, a second object 20c, a sensor body 30c, and a shielding element 40c. The sensor body 30c is disposed on the first object 10c, and the shielding element 40c is disposed on the second object 20c. Additionally, the first object 10c includes a first actuator member 50c. The second object 20c is connected with a second actuator member 60c.

In this embodiment, the shielding element 40c includes a swing arm 41c, a shielding part 42c, a lever 43c, and a lifting part 45c. The shielding part 42c is connected to the swing arm 41c and disposed corresponding to the detecting positions of the sensor body 30c. The lever 43c and the lifting part 45c are connected to the swing arm 41c and located on opposite sides of the swing arm 41c.

Moreover, the first actuator member 50c includes a pivot 51c, a pressing plate 52c connected to the pivot 51c, and a second counterweight 53c disposed on one side of the pressing plate 52c spacedly. The second actuator member 60c includes a rod with one end connected to the inner wall surface of the second object 20c, and the other end of the second actuator member 60c is connected to the lifting part 45c of the shielding element 40c.

Accordingly, when the first object 10c moves away from the base 70c, the second counterweight 53c moves toward the base 70c, and the pressing plate 52c may drive the lever 43c and the swing arm 41c. The swing arm 41c is driven to rotate around the shaft 411c as the axle center and drive the shielding part 42c to move out of the sensor body 30c. Furthermore, when the second object 20c moves away from the first object 10c, the second actuator member 60c may drive the lifting part 45c to move upwardly. Then, the swing arm 41c is driven to rotate around the shaft 411c as the axle center and drive the shielding part 42c to move out of the sensor body 30c to trigger the sensor body 30c, so as to achieve the function of detecting the action of the second object 20c.

Figure 17:
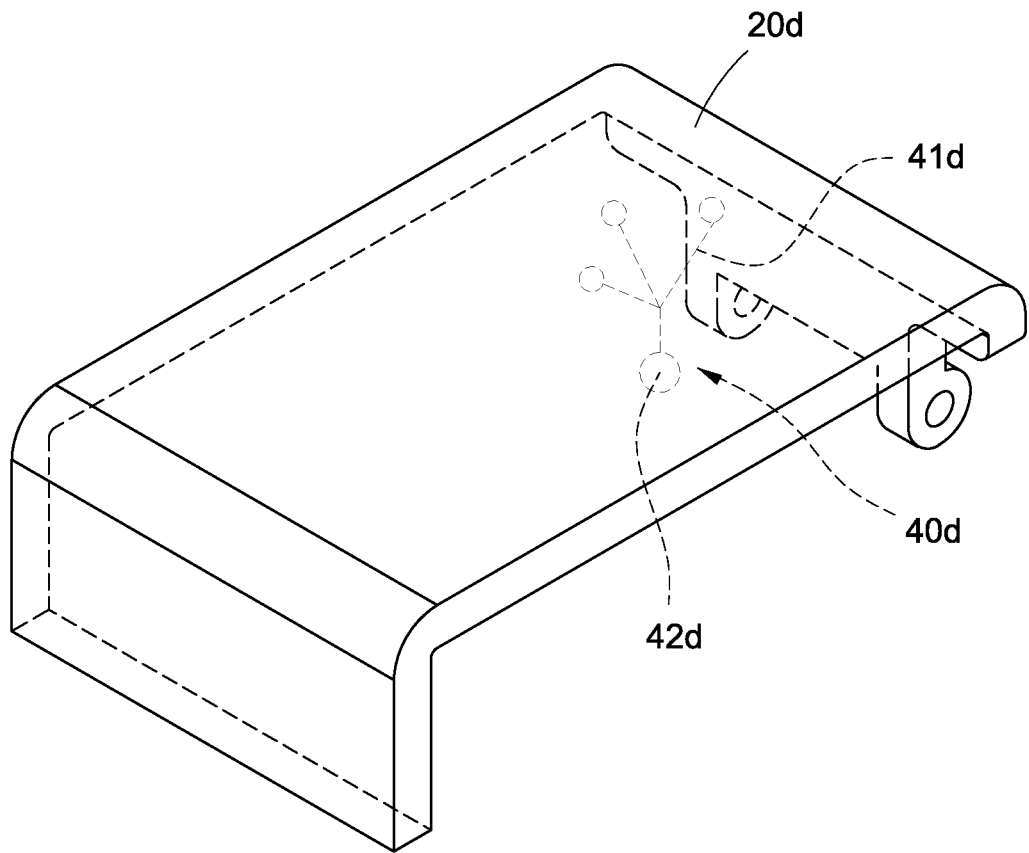
FIG. 17 is the fifth embodiment of the dual-axle linkage detection structure in this disclosure.

Please refer to FIG. 17, which depicts the fifth embodiment of the dual-axle linkage detection structure in this disclosure. This embodiment is similar to the previous embodiment, and the similar content is omitted here for brevity. In this embodiment, a shielding element 40d is installed inside the second object 20d. The shielding element 40d includes a shielding part 42d and a plurality of drawstrings 41d connected to the second object 20d and the shielding part 42d. Therefore, the shielding part 42d moves into or out of the aforementioned detecting slot when the second object 20d is in the process of lifting or covering.

While this disclosure has been described by means of specific embodiments, numerous modifications and variations could be made thereto by those skilled in the art without departing from the scope and spirit of this disclosure set forth in the claims.

What is claimed is:

1. A dual-axle linkage detection structure, disposed on a base, the detection structure comprising:
   a first object, movably connected to the base;
   a second object, movably connected to the first object;
   a sensor body, disposed on the first object and comprising a first detecting position and a second detecting position; and
   a shielding element, disposed on the second object and comprising a shielding part disposed corresponding to the sensor body;
   wherein when the second object is configured to cover the first object and the first object is configured to cover the base, the shielding part is located at the first detecting position; and
   when the second object is configured to move away from the first object, or when the first object is configured to move away from the base, the shielding part is located at the second detecting position;
   wherein the shielding element further comprises a rotating shaft connected to the shielding part, and the first object is configured to move away from the base to drive the shielding element to rotate around the rotating shaft as an axle center to make the shielding part at the second detecting position.

2. The detection structure according to claim 1, wherein the first object comprises a scanner cover, the second object comprises a paper feeder cover, and the base comprises a scanner body.

3. The detection structure according to claim 1, wherein the shielding part comprises a rod and a blocking part located on an end of the rod, and the blocking part comprises a cylinder and a notch.

4. The detection structure according to claim 1, wherein the second object comprises a plurality of positioning portions, and the rotating shaft is disposed on each of the positioning portions.

5. The detection structure according to claim 1, wherein the shielding element further comprises a first counterweight connected to the rotating shaft and disposed on one side of the shielding part spacedly.

6. The detection structure according to claim 1, wherein the sensor body comprises a transmitting terminal, a receiving terminal, and a detecting slot located between the transmitting terminal and the receiving terminal, and the sensor body is configured to send a detecting signal from the transmitting terminal to the receiving terminal through the detecting slot to configure the first detecting position.

7. The detection structure according to claim 6, wherein the detecting slot comprises an upper opening facing the second object; and
   when the second object is configured to move away from the first object, the shielding part is configured to move out of the first detecting position from the upper opening.

8. The detection structure according to claim 7, wherein the detecting slot comprises a side opening perpendicular to the upper opening; and
   when the first object is configured to move away from the base, the shielding part is configured to move out of the first detecting position from the side opening.

9. A dual-axle linkage detection structure, disposed on a base, the detection structure comprising:
   a first object, movably connected to the base and comprising a first actuator member;
   a second object, movably connected to the first object and comprising a second actuator member;
   a sensor body, disposed on the first object and comprising a first detecting position and a second detecting position; and
   a shielding element, comprising a swing arm and a shielding part connected to the swing arm, the swing arm disposed pivotally on the first object by a shaft, and the shielding part disposed corresponding to the first detecting position and the second detecting position;
   wherein when the second object is configured to cover the first object and the first object is configured to cover the base, the shielding part is located at the first detecting position; and
   when the second object is configured to move away from the first object and drive the swing arm to rotate around the shaft as an axle center through the second actuator member, or when the first object is configured to move away from the base and drive the swing arm to rotate around the shaft as the axle center through the first actuator member, the shielding part is located at the second position.

10. The detection structure according to claim 9, wherein the sensor body comprises a transmitting terminal, a receiving terminal and a detecting slot located between the transmitting terminal and the receiving terminal, and the sensor body is configured to send a detecting signal from the transmitting terminal to the receiving terminal through the detecting slot to configure the first detecting position.

11. The detection structure according to claim 9, wherein the first actuator member comprises a pivot, a pressing plate connected to the pivot, and a second counterweight disposed on one side of the pressing plate spacedly; and the shielding element further comprises a compressing part connected to the swing arm and located on a side opposite to the shielding part, and the pressing plate is disposed corresponding to the compressing part.

12. The detection structure according to claim 9, wherein the shielding element further comprises a lifting part connected to the swing arm and located on one side of the shielding part, and the second actuator member is configured to drive the lifting part and move the shielding part out of the first detecting position.

13. The detection structure according to claim 9, wherein the second actuator member comprises a protruding rib disposed on an inner wall of the second object.

14. The detection structure according to claim 9, wherein the shielding element further comprises a lever and a lifting part, and the shielding part is connected to the swing arm and disposed corresponding to the first detecting position and the second detecting position of the sensor body; and the lever and the lifting part are connected to the swing arm and located on opposite sides of the swing arm, and the second actuator member comprises a bar connected to an inner wall surface of the second object, and the second actuator member is connected to the lifting part.

15. A dual-axle linkage detection structure, disposed on a base, the detection structure comprising:

a first object, movably connected to the base;
a second object, movably connected to the first object;
a sensor body, disposed on the first object and comprising a first detecting position and a second detecting position; and
a shielding element, disposed on the second object and comprising a shielding part disposed corresponding to the sensor body;

wherein when the second object is configured to cover the first object and the first object is configured to cover the base, the shielding part is located at the first detecting position; and when the second object is configured to move away from the first object, or when the first object is configured to move away from the base, the shielding part is located at the second detecting position;

wherein the sensor body comprises a transmitting terminal, a receiving terminal, and a detecting slot located between the transmitting terminal and the receiving terminal, and the sensor body is configured to send a detecting signal from the transmitting terminal to the receiving terminal through the detecting slot to configure the first detecting position;

wherein the detecting slot comprises an upper opening facing the second object; and when the second object is configured to move away from the first object, the shielding part is configured to move out of the first detecting position from the upper opening;

wherein the detecting slot comprises a side opening perpendicular to the upper opening; and when the first object is configured to move away from the base, the shielding part is configured to move out of the first detecting position from the side opening.

16. The detection structure according to claim 15, wherein the first object comprises a scanner cover, the second object comprises a paper feeder cover, and the base comprises a scanner body.

17. The detection structure according to claim 15, wherein the shielding part comprises a rod and a blocking part located on an end of the rod, and the blocking part comprises a cylinder and a notch.

18. The detection structure according to claim 15, wherein the shielding element further comprises a rotating shaft connected to the shielding part, and when the first object is configured to move away from the base to drive the shielding element to rotate around the rotating shaft as an axle center to make the shielding part at the second detecting position.

19. The detection structure according to claim 18, wherein the second object comprises a plurality of positioning portions, and the rotating shaft is disposed on each of the positioning portions.

20. The detection structure according to claim 18, wherein the shielding element further comprises a first counterweight connected to the rotating shaft and disposed on one side of the shielding part spacedly.

* * * * *